(12) United States Patent
Sweigart (10) Patent No.: US 8,602,278 B2
(45) Date of Patent: Dec. 10, 2013

(54) AERODYNAMIC BOTTLE SUPPORT CAGE FOR BICYCLES

(76) Inventor: Todd E. Sweigart, Virginia Beach, VA (US)

( * ) Notice: Subject to any disclaimer, the term of this patent is extended or adjusted under 35 U.S.C. 154(b) by 8 days.

(21) Appl. No.: 13/317,185

(22) Filed: Oct. 12, 2011

(65) Prior Publication Data

US 2012/0104063 A1 May 3, 2012

Related U.S. Application Data

(60) Provisional application No. 61/455,788, filed on Oct. 27, 2010.

(51) Int. Cl.
*A45F 3/16* (2006.01)
*A45F 3/18* (2006.01)

(52) U.S. Cl.
USPC .................... 224/414; 224/148.4; 224/148.7

(58) Field of Classification Search
USPC ........... 224/414, 425, 442, 926, 148.4, 148.7; 220/304
See application file for complete search history.

(56) References Cited

U.S. PATENT DOCUMENTS

| | | | |
|---|---|---|---|
| 1,222,458 A * | 4/1917 | Peterson | 362/474 |
| 4,441,638 A | 4/1984 | Shimano | |
| 4,697,725 A * | 10/1987 | Miree | 224/420 |
| D295,724 S | 5/1988 | Shioda | |
| 5,060,832 A | 10/1991 | Link | |
| 5,062,591 A | 11/1991 | Runkel | |
| 5,170,981 A * | 12/1992 | Lin | 248/311.2 |
| 5,197,640 A * | 3/1993 | Hurley et al. | 224/414 |
| 5,325,991 A * | 7/1994 | Williams | 220/739 |
| 5,423,509 A * | 6/1995 | LaPorte et al. | 248/311.2 |
| 5,497,920 A * | 3/1996 | Moeller et al. | 224/414 |
| 5,803,328 A * | 9/1998 | Nakahara | 224/420 |
| 6,401,997 B1 | 6/2002 | Smerdon, Jr. | |
| 6,953,135 B2 | 10/2005 | Litton et al. | |
| 7,631,784 B2 * | 12/2009 | Hollis | 222/175 |
| 8,215,511 B1 * | 7/2012 | Lin | 220/212.5 |
| 2002/0148868 A1 * | 10/2002 | Dion-Bildstein et al. | 224/401 |
| 2004/0256428 A1 * | 12/2004 | Meggiolan | 224/414 |
| 2005/0156001 A1 * | 7/2005 | Dal Pra et al. | 224/414 |
| 2007/0000961 A1 * | 1/2007 | Chung | 224/425 |
| 2007/0012740 A1 * | 1/2007 | Montgomery | 224/414 |
| 2007/0222619 A1 * | 9/2007 | Moran | 340/573.1 |
| 2008/0053266 A1 * | 3/2008 | Smolik | 74/551.8 |
| 2008/0170925 A1 * | 7/2008 | Marmur | 410/80 |
| 2010/0038390 A1 * | 2/2010 | Chang | 224/425 |
| 2010/0059565 A1 | 3/2010 | Cote | |
| 2010/0072232 A1 | 3/2010 | Rider | |

* cited by examiner

*Primary Examiner* — Nathan J Newhouse
*Assistant Examiner* — Lester L Vanterpool
(74) *Attorney, Agent, or Firm* — William G. Sykes (57) ABSTRACT

An aerodynamic, hands free liquid containment system for horizontal mounting on to a bicycle handlebar and aerobars. The water bottle and the bottle cage are aerodynamically shaped and positioned between a rider's arms to eliminate turbulence and reduce drag on the bicycle and rider. The cage typically clips to both the aerobar extensions and the horizontal sections of the handlebars. The water bottle includes an opening for filling the container and another opening for receiving a flexible drinking tube. The opening for filling the container can be closed with a removable cover and includes a splash flap to avoid spilling of the reservoir contents.

15 Claims, 7 Drawing Sheets

AERODYNAMIC BOTTLE SUPPORT CAGE FOR BICYCLES

RELATED APPLICATIONS

This application is a Continuation-in-Part Application that claims priority in accordance with 37 C.F.R. §119(e) to U.S. Provisional Patent Application Ser. No. 61/455,788, Aerodynamic Water Bottle and Water Bottle Support Device for Bicycles, Filed Oct. 27, 2010 and included herein in its entirety by reference.

FIELD OF THE INVENTION

The invention pertains to the field of bicycle accessories and, more particularly, to an aerodynamic bottle cage for universal bicycle handlebar and/or aerobar mounting and a bottle adapted for use therewith.

BACKGROUND OF THE INVENTION

Both recreational and competitive cycling have grown in popularity over the past several years. Along with this explosive growth, the demand for bicycle accessories has consequently risen. One bicycle accessory deemed necessary for cycling long distances, more especially, for competitive cycling, is a bottle allowing a cyclist to carry liquids such as water to replenish fluids lost through long periods of or strenuous riding.

Several liquid delivery systems for cyclists are well known in the prior art. These systems include a removable bottle and cage mounted on a bicycle frame member, a reservoir adapted for attachment to a bicycle saddle rails or seat post, a reservoir carried on a bicycle rider's back with a tube extending in front of the rider's face, and several pressurized and non-pressurized frame member liquid delivery systems.

The first of these major types of bottles and bottle holders or cages has a structure designed to selectively receive and retain replaceable bottles of liquid. Once a bottle is consumed by the rider, it may be replaced by a new, full bottle. The simplest of this first type of holder has at least two generally U-shaped sections, between which the replaceable water bottle is nested.

The second type of bottle and holder utilizes a permanent tank forming a removable part of the structure. The tank is filled from an external source and, when depleted, is refilled. Such arrangements may have a tube leading from the tank with a distal end positioned for easy access by a rider's mouth with no intervention by a rider's hand required.

Although the heretofore known liquid delivery systems have sufficed to provide liquid transport and delivery for cyclists, many of the needs of enthusiasts, elite cyclists, mountain bicyclists, triathletes, and others seeking an aerodynamic design have not been addressed. These cyclists would benefit from a system that allows easy and continuous access to fluids without taking their hands off the handlebars or taking their eyes away from the road. It is desirable to provide the ability to refill the reservoir from another liquid source while riding, and to provide enhanced aerodynamic performance due to the design and placement of the reservoir. Given the cost of many of today's bicycles and the use of carbon fiber frames, it is desirable to provide a mounting system that is aerodynamic and that when attached or detached does not leave a mark on the frame.

In addition, bicycle frames are no longer constructed of just cylindrical tubes. Several of today's elite bicycles have aerodynamically and structurally optimized frame members with varying cross sectional shapes.

Therefore, there exists a need for a system that easily mounts on several different types of bicycles.

DISCUSSION OF THE RELATED ART

Several examples of liquid reservoirs for use by cyclists may be found in the prior art. For example, U.S. Pat. No. 5,115,952 for DEVICE FOR PROVIDING LIQUID FLUID FOR CYCLISTS. Issued May 26, 1992 to John D. Jenkins and U.S. Pat. No. 5,788,134 for LIQUID CARRYING APPARATUS FOR BICYCLE, issued Aug. 4, 1998 to Thomas Matic, Jr. both disclose frame member mounted fluid carrying systems that satisfy some of these aforementioned needs. However, these systems do not allow easy refilling and are not aerodynamically optimized either in terms of their shapes or their attachment methods. Furthermore, their attachment methods may mark the frame.

U.S. Pat. No. 5,215,231 for WATER SUPPLY APPARATUS FOR BICYCLE issued Jun. 1, 1993 to Joseph R. Paczonay discloses a reservoir mounted to a frame member with a tube that runs along a cyclist's back. This system keeps the cyclist attached to the reservoir and does not allow for the cyclist to easily mount and dismount the bicycle as is required in sports such as triathlon competitions.

U.S. Pat. No. 4,441,638 for WATER BOTTLE FOR A BICYCLE issued Apr. 10, 1984 to Keizo Shimano teaches an aerodynamically shaped water bottle and cage adapted for mounting on a frame member. This system still requires the rider to take his or her hand off of the handlebars to reach for the bottle. Doing so can cause instability while riding, resulting in a crash causing injury or even death. Furthermore, the attachment methods can mark the frame.

Previously known fluid carrying systems devices have also used pressurized reservoirs. However, such systems typically also require a rider using his or her hands to interact with the system while riding, causing safety hazards. U.S. Pat. No. 5,143,390 for PRESSURIZATION APPARATUS FOR CYCLE MOUNTED ACCESSORIES issued Sep. 1, 1992 to Patrick M. Goldsmith, for example, discloses a pressurized bottle that includes several elements that require interaction with the rider.

U.S. Pat. No. 6,953,135 for LIQUID DELIVERY APPARATUS FOR BICYCLE issued Oct. 11, 2005 to Linda Litton et al. discloses a refill system that accepts commercially available bottles to refill a reservoir mounted below a bicycle seat. This system addresses many of the needs of an elite level cyclist or tri-athlete. However, wind tunnel tests suggest that this system may provide poor aerodynamic performance because it increases the total aerodynamic drag as compared to a bicycle and rider alone. Thus, there exists a need for a fluid carrying and delivery system that accommodates the needs of an elite level cyclist while addressing the safety concerns of recreational cyclists.

None of the patents taken singly or in any combination are seen to teach or suggest the novel aerodynamic bottle support apparatus for bicycles of the present invention.

SUMMARY OF THE INVENTION

In accordance with the present invention there is provided an aerodynamic, hands free liquid reservoir system for mounting horizontally on to a bicycle handlebar or frame member, particularly on an aerobar. An embodiment of the container has rounded ends and a bottom portion that makes contact with the bicycle aerobar extensions of the bicycle handlebar. The water bottle and the bottle cage or holder are both aerodynamically shaped. The presence of the inventive reservoir eliminates much of the turbulent wake caused by systems of the prior art and reduces the aerodynamic drag on the bicycle.

The reservoir is held in place horizontally by an attachment device that typically clips to both the aerobar extensions and the horizontal sections of the handlebars. The water bottle is mounted atop the bicycle handlebars between the rider's arms.

The water bottle includes an opening for filling the container and another opening for receiving a flexible drinking tube. In an illustrative embodiment, the opening for filling the container can be closed with a removable vented cover or a splash flap to avoid spilling of the reservoir contents.

It is, therefore, an object of the invention to provide a hands free, aerodynamically engineered liquid reservoir for horizontal attachment to both the aerobars and handlebars of a bicycle.

It is another object of the invention to provide a hands free, aerodynamically engineered liquid reservoir for horizontal attachment to both the aerobars and handlebars of a bicycle that includes an external drinking tube positioned proximate the mouth of a rider to allow the rider to drink therefrom without removing his or her hands from the bicycle handlebars.

It is an additional object of the invention to provide a hands free, aerodynamically engineered liquid reservoir for horizontal attachment to both the aerobars and handlebars of a bicycle wherein the liquid reservoir may readily be refilled from a bottle, typically a bottle having a so-called sports top.

It is a further object of the invention to provide a hands free, aerodynamically engineered liquid reservoir for horizontal attachment to both the aerobars and handlebars of a bicycle wherein the cage and liquid reservoir is positioned between the arms of a rider, the position substantially eliminating any turbulence induced drag.

It is a still further object of the invention to provide a hands free, aerodynamically engineered liquid reservoir for attachment to both the aerobars and handlebars of a bicycle that may be adjustably mounted on bicycles having differently spaced and sized aerobars, handle bars and/or stem configurations.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein:

FIG. 1b is a detailed exploded, perspective, schematic view of an alternate embodiment of a portion of the cage assembly of FIG. 1a;

DETAILED DESCRIPTION OF THE PREFERRED EMBODIMENT

The present invention provides a cage and bottle system for providing water or another liquid to a rider of a high-performance bicycle, for example a triathlon or "tri" bike. Characteristic of such bicycles is the use of forward-projecting horizontal aerobars attached to or forming part of the bicycle's handlebar. Such handlebar/aerobar arrangements are believed to be well known to those of skill in the art and are not further discussed herein.

Figure 1A:
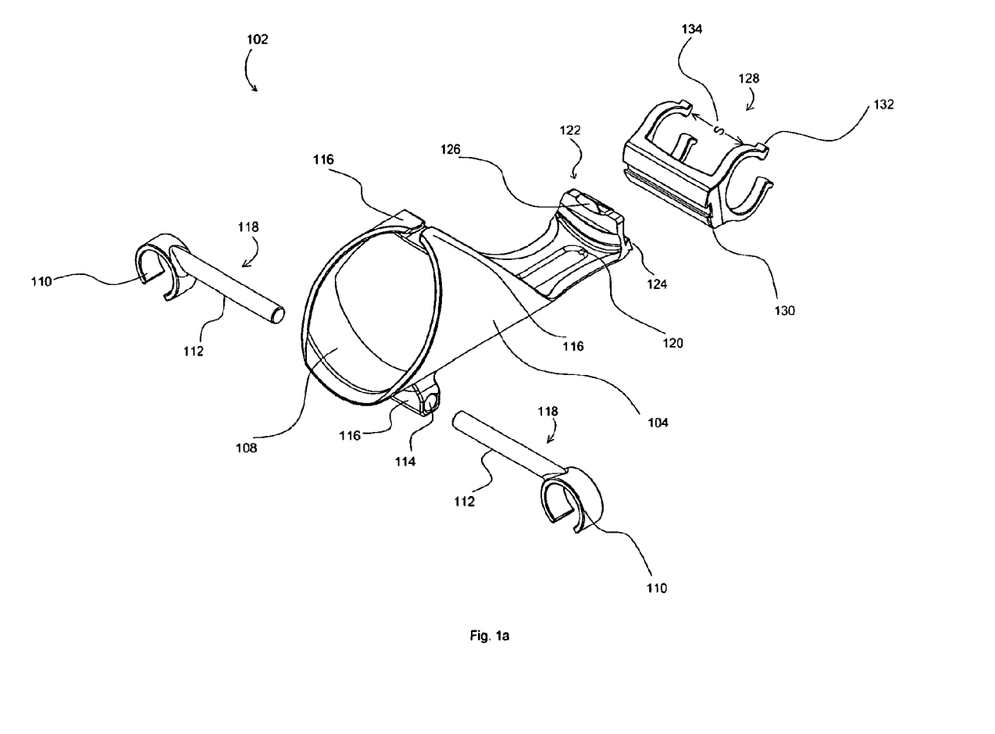
FIG. 1a is an exploded, perspective, schematic view of a first embodiment of a cage assembly in accordance with the invention.

Referring first to FIG. 1a, there is shown an exploded, perspective, schematic view of a cage assembly in accordance with the invention, generally at reference number 102. A central cage member 104 is typically formed from a polymeric material such that upper tip regions 106 tend to exert an inward pressure toward one another. Such inward pressure is, therefore, exerted on any cylindrical object, not shown, inserted into a central, substantially cylindrical opening 108 formed therebetween.

A pair of adjustable aerobar clip assemblies 118, each having an aerobar clip 110 disposed at the distal end of an aerobar clip shaft 112. Each aerobar shaft 112 is adapted for insertion in opening 114 of aerobar connector 116 disposed adjacent a front edge of central cage member 104.

A condensation drain hole 120 is disposed in a bottom of central cage member 104.

A rear portion 122 of central cage member 104 has a first portion on a dovetail connector system 124 disposed on a rearward outer vertical surface thereof.

A bottle stop 126 is disposed on an upper edge of rear portion 122.

In a first embodiment, a tailpiece 128 has a second portion of a dovetail connector 130 sized and configured for slidable interaction with first dovetail connector portion 124.

Figure 2:
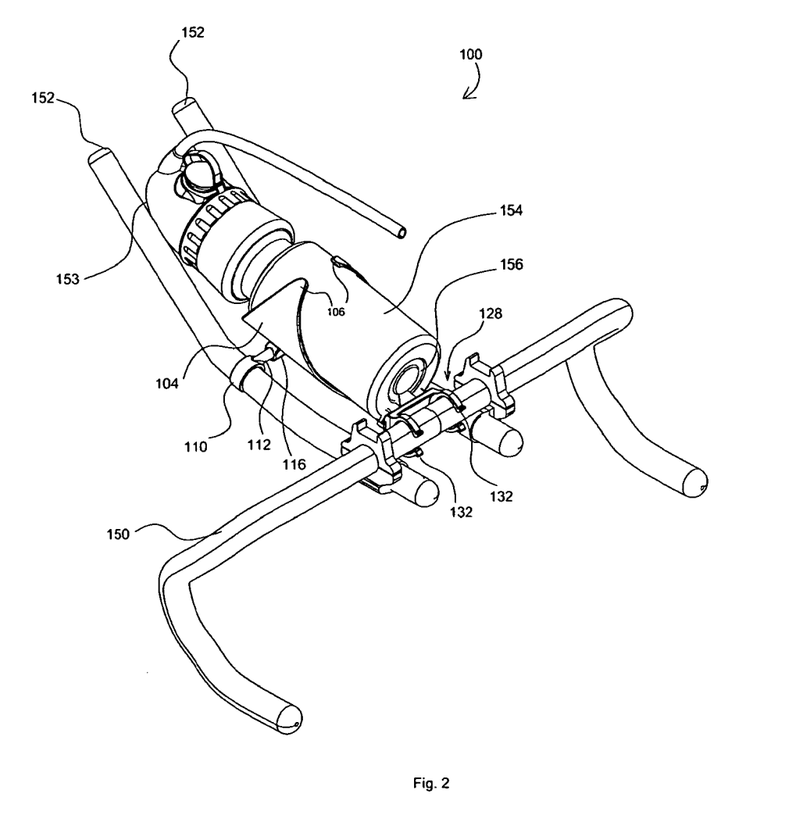
FIG. 2 is a perspective, schematic view of a handlebar portion of a typical triathlon or "tri" bike having the cage of FIG. 1a and a bottle assembly mounted horizontally thereupon.

A pair of handlebar clips 132 are disposed at opposite ends of handlebar clip assembly 128 and spaced apart a distance "S" 134 so as to conform to an available attachment space on the bicycle handlebar 150 (FIG. 2).

Figure 1B:
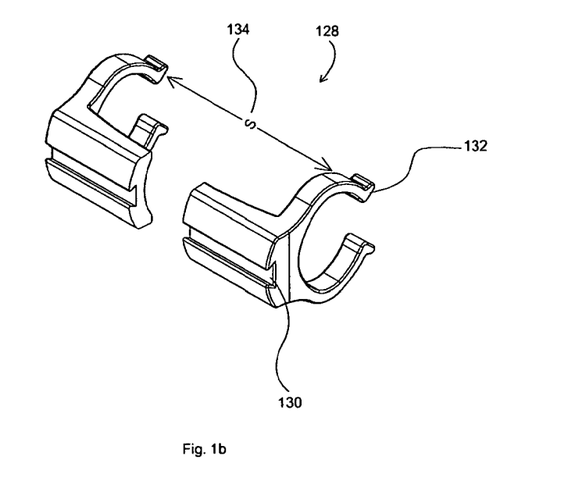

Referring now also to FIG. 1b, there is shown an alternate embodiment of handlebar clip assembly 128, generally at reference number 140. Handlebar clip assembly 140 consists of two separate handlebar clips 132a, 132b, each having a second portion of a dovetail connector 130a, 130b, respectively. Consequently, handlebar clips 132a, 132b may independently engage first dovetail portion 124 and may be independently positioned thereupon at any desired spaced apart distance S' 142. This allows cage assembly 102 to be installed upon bicycles, not shown, having different handlebar 150 and stem configurations.

Referring now also to FIG. 2, there is shown a perspective, schematic view of a handlebar portion of a typical tri bike having a cage and bottle assembly 100 mounted horizontally thereupon. It will be recognized that the bicycle parts illustrated form no part of the present invention and are provided solely to illustrate the novel cage and bottle assembly 100 in its intended operating environment.

Bicycle handlebar 150 has a pair of aerobars 152 attached thereto and projecting forward therefrom Such handlebar/aerobar arrangements are believed to be well known to those of skill in the art and are, therefore, not further discussed herein. Neither handlebar 150 nor aerobars 152 form any part of the present invention.

Figure 3:
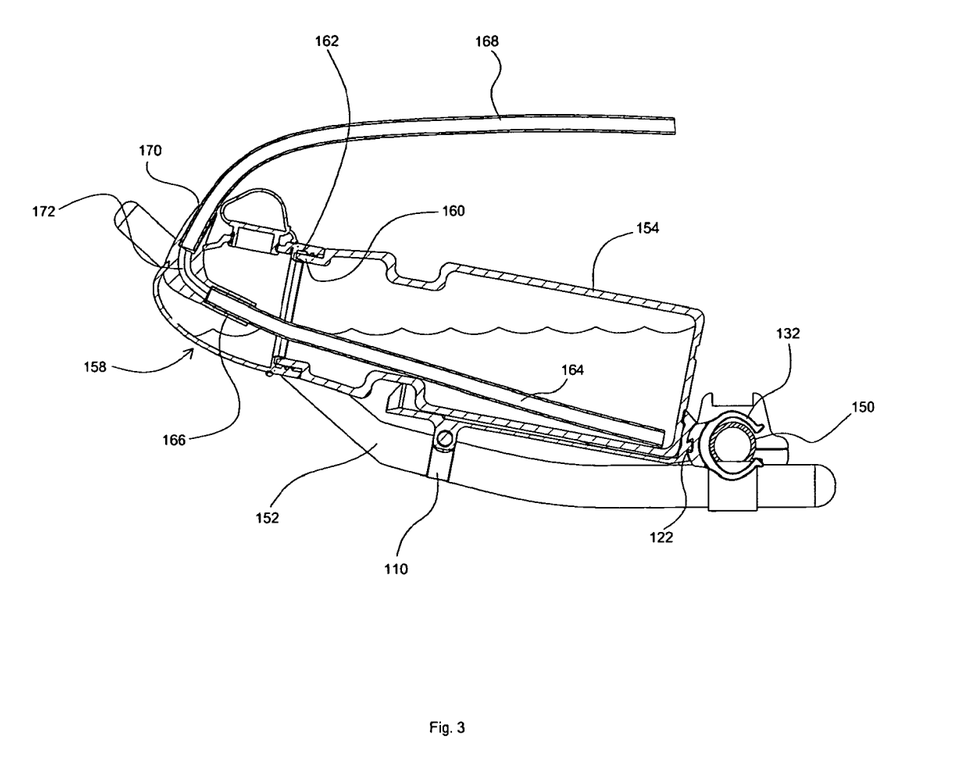
FIG. 3 is a cross-sectional, schematic view of the handlebar portion and bottle assembly of FIG. 2.

Referring now also to FIG. 3, there is shown a cross-sectional, schematic arrangement of a portion of the arrangement seen in FIG. 2. A bottle 154 is captured within central cage member 104 with a bottom surface 156 thereof adjacent tailpiece 128. An aerodynamically engineered, generally "bullet" shaped bottle cap assembly 158 is screwably attached to a threaded neck 160 of bottle 154 via mating internal cap threads 162.

An internal bottle straw 164 extends inwardly from a straw fitting seal 166 within bottle cap assembly 158. An external tube 168 projects outwardly from bottle cap assembly 158. External tube 168 is received in an external fitting seal 170 that is communicative with straw connector portion 166 via an internal connection 172.

Figure 4A:
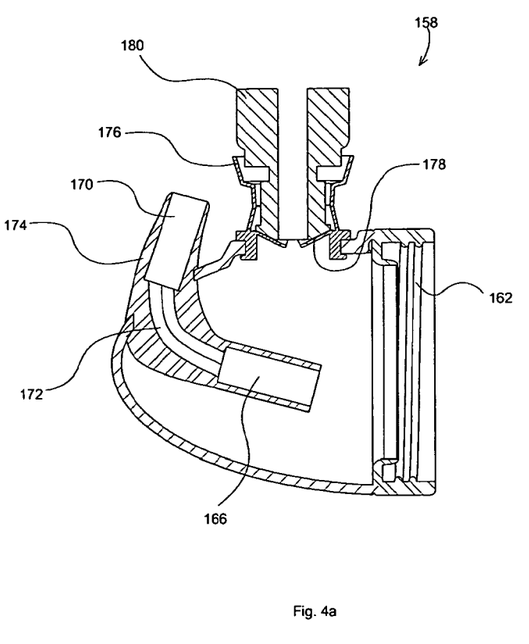
FIGS. 4a and 4b are side, cross-sectional, schematic and a top perspective, schematic views, respectively, of a first embodiment of a bottle cap assembly in accordance with the invention.
Figure 4B:
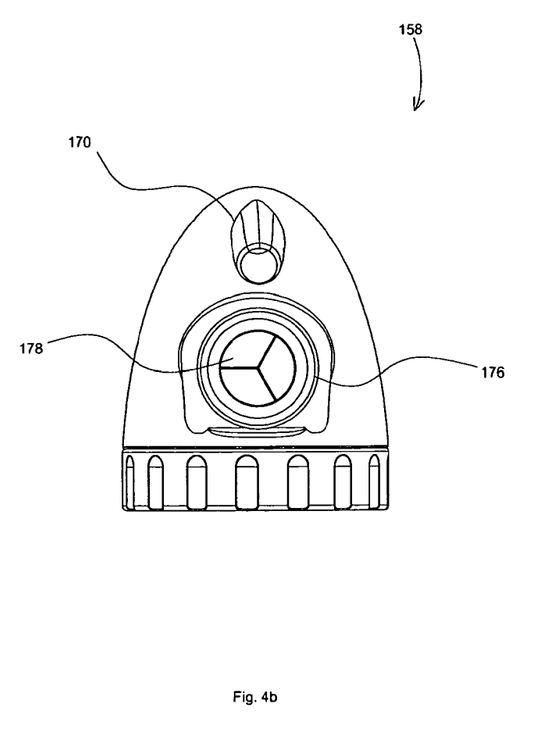

Referring now also to FIGS. 4a and 4b, there are shown a side, cross-sectional, schematic and a top perspective schematic view, respectively, of a first embodiment of a bottle cap assembly 150. As may be seen in more detail, straw fitting seal 166, internal connection 172, and external fitting seal are all contained in a straw fitting portion 174. Straw fitting portion 174 is secured in an opening in bottle cap assembly 158.

A cap plug funnel 176 is fitted to another opening in bottle cap assembly 158 and, when in a normal operating orientation, extends substantially vertically therefrom. Disposed at the bottom of cap funnel assembly 176 are cap funnel splash flaps 178 that form a barrier to prevent liquid within bottle 154 from splashing out when bottle 154 is subjected to shock and/or vibration.

As seen in FIG. 4a, a sport cap portion 180 of a water bottle is inserted into cap plug funnel 176 such that bottle or tank 154 is filled or refilled from the bottle attached to sport cap portion 180.

Figure 4C:
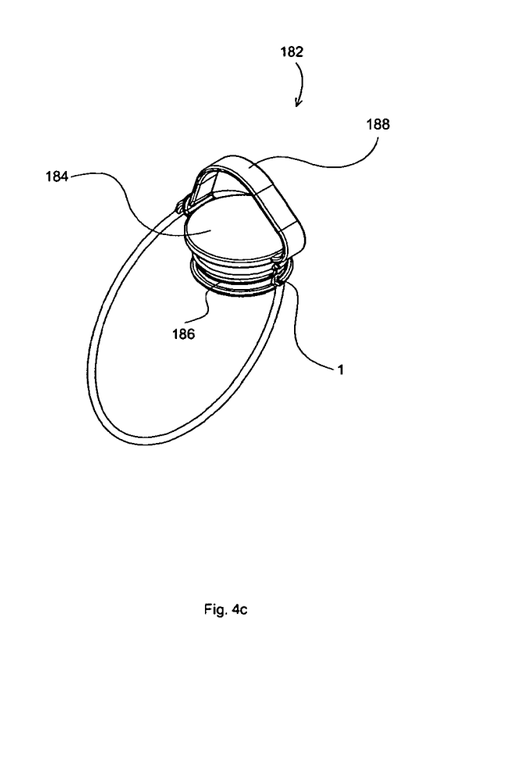
FIG. 4c is a perspective schematic view of a cap plug for use with the bottle cap assembly of FIGS. 4a and 4b.

Referring now also to FIG. 4c, there is shown a perspective, schematic view of a vented plug assembly 182. Cap plug assembly 182 consists of a cap plug 184 having resilient ridges 186 disposed on a lower barrel portion thereof. A cap leash 188 is disposed adjacent an upper edge of cap plug 184.

A vent 190 is formed in resilient ridges 186 allows equalizing air pressure to flow into bottle 154 as liquid, not specifically identified is withdrawn therefrom via external tube 168.

In operation, cage assembly 102 is fastened to a bicycle, not shown, and positioned as desired thereupon. Liquid is placed in bottle or tank 154 which, if not already inserted into cages assembly 102, is inserted therein.

As a cyclist rides, he or she sucks a distal end of tube 168, thereby withdrawing liquid from bottle 154 vial internal bottle straw 164 and internal connection 172.

When the contents of tank 154 require replenishment, plug assembly 182 is withdrawn and the sport top of a water bottle or other such bottle is inserted into bottle cap assembly 158 allowing the bottle contents to drain into tank 154.

When refilling is complete, the sport top bottle is withdrawn from bottle cap assembly 158 and plug assembly 182 is re-inserted into 158.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A horizontally mounted aerodynamic bottle cage assembly, comprising:
   a) an elongated, rigid, horizontally mounted central cage member having a forward, distal end, a rearward, proximal end, and longitudinal opening sized and configured to encircle and retain at least a portion of a liquid bottle disposed along a major axis of said central cage member between said forward, distal end and said rearward, proximal end;
   b) a pair of aerobar clip assemblies, each comprising an aerobar clip sized and configured to at least partially encircle an aerobar forming part of a triathlon style bicycle disposed at a distal end of a corresponding aerobar clip shaft, a proximal end of each of said aerobar clip shafts being slidably and adjustably received in said central cage member proximate said forward distal end thereof, each of said aerobar clip assemblies being aligned perpendicularly to said longitudinal axis of said central cage member and projecting outwardly from a respective left side and right side thereof; and
   c) a handle bar clip assembly having a forward edge, a rearward edge, and a longitudinal axis slidably attached to said central cage assembly at said rearward, proximal end thereof, said handle bar clip assembly comprising at least one handle bar clip disposed at said rearward edge and sized and configured to at least partially encircle a portion of a handlebar of said triathlon style bicycle, said handle bar clip assembly comprising a first portion of a dovetail connector disposed on a forward edge thereof and adapted and configured to slidably interact with a second portion of a dovetail connector disposed on said rearward, distal end of said central cage member, said second dovetail connection being disposed substantially perpendicular to said longitudinal axis of said central cage member;
   whereby said horizontally mounted aerodynamic bottle cage assembly is secured to at least one of the mounting points selected from the group: handle bars, and aerobars of a triathlon-style bicycle.

2. The horizontally mounted aerodynamic bottle cage assembly as recited in claim 1, wherein said handle bar clip assembly comprises two handle bar clips spaced apart from one another a predetermined distance along said longitudinal axis of said handlebar clip assembly.

3. The horizontally mounted aerodynamic bottle cage assembly as recited in claim 1, wherein said handle bar clip assembly comprises two discrete pieces, each of said two discrete pieces comprising a single handle bar clip and a first portion of a dovetail connector disposed on a forward edge thereof and adapted and configured to independently slidably interact with said second dovetail connector, whereby a space between a first of said two discrete pieces and a second of said two discrete pieces may be varied.

4. The horizontally mounted aerodynamic bottle cage assembly as recited in claim 1, wherein said central cage member further comprises a bottle stop disposed proximate said rearward proximal end.

5. The horizontally mounted aerodynamic bottle cage assembly as recited in claim 1, wherein said central cage member further comprises a drain hole disposed in a lower region thereof and proximate said rearward proximal end.

6. The horizontally mounted aerodynamic bottle cage assembly as recited in claim 1, further comprising:
   d) a horizontally attached liquid reservoir disposed and removably retained within said longitudinal opening of said region of said elongated central cage member, said liquid reservoir having a body and a cap assembly removably affixed thereto, said cap assembly being disposed proximate said forward distal end of said central cage member.

7. The horizontally mounted aerodynamic bottle cage assembly as recited in claim 6, wherein said cap assembly is removably affixed to said body by internal threads disposed on said cap assembly and a mating thread disposed on said liquid reservoir.

8. The horizontally mounted aerodynamic bottle cage assembly as recited in claim 6, wherein said cap assembly comprises:
   i) means for retaining an internal straw disposed within said reservoir and operatively connected to means for retaining an external tube; and
   ii) means for filling said reservoir.

9. The horizontally mounted aerodynamic bottle cage assembly as recited in claim 6, wherein said means for filling comprises a cap plug funnel.

10. The horizontally mounted aerodynamic bottle cage assembly as recited in claim 6, wherein said liquid reservoir comprises a bottle.

11. The horizontally mounted aerodynamic bottle cage assembly as recited in claim 6, wherein said handle bar clip assembly comprises a first portion of a dovetail connector disposed on a forward edge thereof and adapted and configured to slidably interact with a second portion of a dovetail connector disposed on said rearward, distal end of said central cage member, said second dovetail connector being disposed substantially perpendicular to said longitudinal axis of said central cage member.

12. The horizontally mounted aerodynamic bottle cage assembly as recited in claim 11, wherein said handle bar clip assembly comprises two handle bar clips spaced apart from one another a predetermined distance along said longitudinal axis of said handlebar clip assembly.

13. The horizontally mounted aerodynamic bottle cage assembly as recited in claim 11, wherein said handle bar clip assembly comprises two discrete pieces, each of said two discrete pieces comprising a single handle bar clip and a first portion of a dovetail connector disposed on a forward edge thereof and adapted and configured to independently slidably interact with said second dovetail connector, whereby a space between a first of said two discrete pieces and a second of said two discrete pieces may be varied.

14. The horizontally mounted aerodynamic bottle cage assembly as recited in claim 11, wherein said central cage member further comprises a bottle stop disposed proximate said rearward proximal end.

15. The horizontally mounted aerodynamic bottle cage assembly as recited in claim 11, wherein said central cage member further comprises a drain hole disposed in a lower region thereof and proximate said rearward proximal end.

* * * * *